Oct. 25, 1949.                W. I. GOSS                2,486,369
             MOTOR VEHICLE AUTOMATIC SPEED REGULATOR
Filed March 9, 1948                              2 Sheets-Sheet 1

INVENTOR.
WENSELL I. GOSS,
BY
McMorrow, Berman & Davidson
ATTORNEYS.

Oct. 25, 1949.　　　　　　W. I. GOSS　　　　　2,486,369
MOTOR VEHICLE AUTOMATIC SPEED REGULATOR
Filed March 9, 1948　　　　　　　　　　　　　　　2 Sheets-Sheet 2

INVENTOR.
WENSELL I. GOSS,
BY
*McMorrow, Berman & Davidson*
ATTORNEYS.

Patented Oct. 25, 1949

2,486,369

UNITED STATES PATENT OFFICE 2,486,369

MOTOR VEHICLE AUTOMATIC SPEED REGULATOR

Wensell I. Goss, Pittsburgh, Pa.

Application March 9, 1948, Serial No. 13,823

4 Claims. (Cl. 192—.084)

1

This invention relates to motor vehicle speed governing devices, and more particularly to a device for automatically regulating the gas feed to the internal combustion engine of a motor vehicle in accordance with a desired speed setting.

A main object of the invention is to provide a novel and improved speed governing mechanism for motor vehicles which operates by controlling the carburetor throttle valve in accordance with a desired speed setting of the device, whereby the operator of a vehicle is relieved of the necessity of holding his foot on the throttle lever over long periods of time when the vehicle may travel for comparatively long distances at a constant speed, the device being very simple in construction, easy to install and reliable in performance.

A further object of the invention is to provide an improved speed governing device for motor vehicles which improves the efficiency of gas consumption of the vehicle engine when the vehicle is travelling over long open stretches by eliminating variations in the rate of gas feed, which automatically reduces the rate of gas feed when the vehicle wheels slip due to loss of traction, and which may be readily placed in operation or rendered inoperative by the driver of the vehicle.

Further objects and advantages of the invention will become apparent from the following description and claims, and from the accompanying drawings, wherein:

Figure 1:
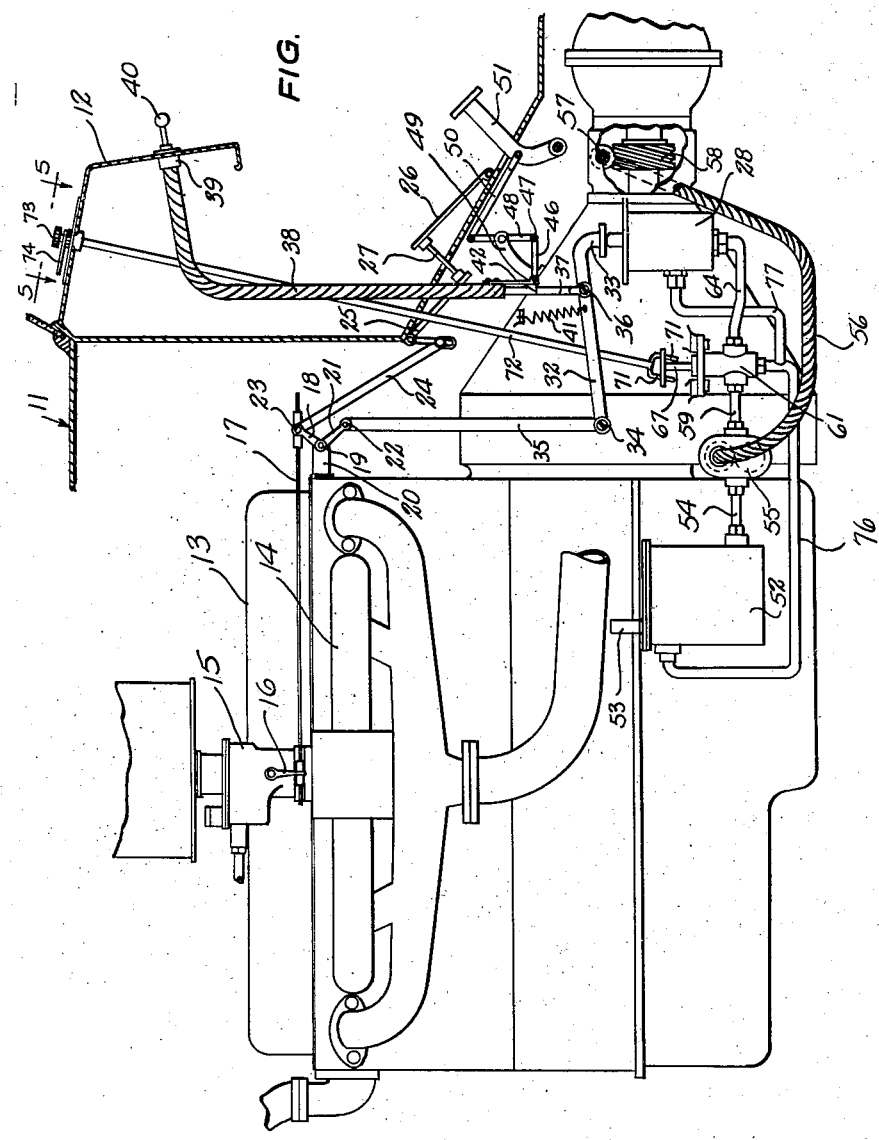
Figure 1 is a fragmentary longitudinal cross-sectional view taken through the forward portion of the chassis of a motor vehicle provided with a speed governing device constructed in accordance with the present invention.
Figure 2:
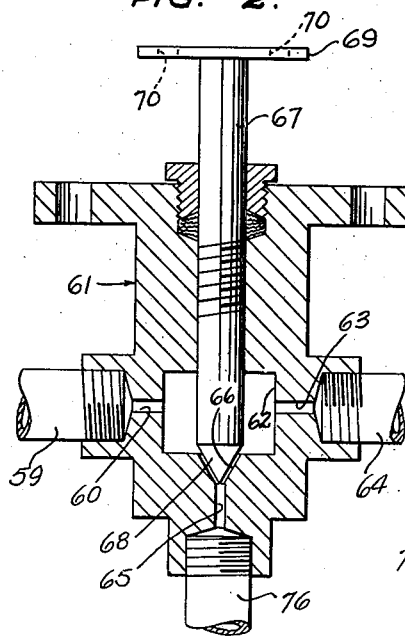
Figure 2 is an enlarged vertical cross-sectional detail view taken through the fluid flow control valve employed in the speed governing device of Figure 1.

Referring to the drawings, 11 designates the chassis of a motor vehicle and 12 designates the vehicle dashboard. The vehicle engine is indicated at 13, said engine having an intake manifold 14 and a carburetor 15 connected to said intake manifold, the carburetor 15 being provided with a throttle valve controlled by a lever 16. The lever 16 is connected by a rod 17 at 23 to one arm 18 of a bell crank lever pivoted at 19 to a rearwardly projecting bracket 20 secured to the engine 13. Pivotally connected to said arm 18 of the bell crank lever at 23 is a link rod 24 connected to a bent lever 25 which is operated by the accelerator pedal 26 through a connecting rod 27. The structure thus far described is conventional.

Designated at 28 is a cylinder, secured in any suitable manner in a vertical position to the vehicle chassis, and slidably contained therein is a vertically movable piston 29 provided with a piston rod 30 which projects slidably through the top wall 31 of cylinder 28. Designated at 32 is an arm formed with a depending flanged end 33 which bears on the top end of piston rod 30. The other end of arm 32 is pivotally connected at 34 to the lower end of a link bar 35. The top end of link bar 35 is pivotally connected at 22 to the end of the other bell crank lever arm 21.

Pivotally connected to arm 32 at 36 is one end of a flexible shaft 37. Shaft 37 is slidably housed in a sheath 38 which extends upwardly beneath the dashboard panel 12 and is secured thereto at 39. The shaft 37 extends through the bushing at 39 and through the panel 12, terminating in a knob 40. The shaft 37 and arm 32 are biased upwardly by a spring 41 connected to said arm forwardly of the pivotal connection 36 and secured to an upwardly adjacent portion of the transmission housing of the vehicle.

Secured to and depending from the lower end of sheath 38 is a resilient arm 42 formed at its lower end with a tapered lug 43 adapted to interlock with a notch 44 formed in the lower portion of shaft 37 and to retain said shaft in a depressed position against the biasing force of spring 41. Normally notch 44 is above lug 43, but when knob 40 is pushed inwardly, the shaft 37 is depressed to move notch 44 into interlocking engagement with lug 43. The lower end of resilient arm 42 is pivotally connected at 45 to a link arm 46. Link arm 46 is pivotally connected at 47 to one end of a lever 48 which is pivoted at its intermediate portion to a bracket 49 carried by the vehicle transmission housing. The other end of lever 48 is connected by a link rod 50 to the clutch lever 51 of the vehicle. When clutch lever 51 is depressed, lever 48 is rotated counter clockwise, as viewed in Figure 1, retracting link arm 46 and disengaging the detent lug 43 from the notch 44.

This allows spring 41 to raise shaft 37 to its normal position.

Designated at 52 is a reservoir secured in any suitable manner to the vehicle chassis. Reservoir 52 contains a quantity of hydraulic liquid, such as oil or the like and is vented at its top wall to atmosphere by an open conduit 53. The lower portion of reservoir 52 is connected by a conduit 54 to a gear pump 55 which is driven by a flexible shaft designated at 56 from the propeller shaft of the vehicle by a worm 57 carried on the end of said flexible shaft which meshes with a worm gear 58 carried by the propeller shaft, the drive being similar to the type of drive employed for the vehicle speedometer. The outlet of pump 55 is connected by a conduit 59 to the intake port 60 of a valve 61 which is secured in a suitable manner to the vehicle chassis forwardly adjacent cylinder 28. Valve 61 is formed with a central chamber 62 communicating with intake port 60 and with an outlet port 63 opposing port 60 in said central chamber. Connecting outlet port 63 to the bottom of cylinder 28 is a conduit 64.

Valve 61 is formed with an axial vertical bottom passage 65 communicating with central chamber 62 at a conical seat 66. Threaded axially through the upper portion of the body of valve 61 is a rod member 67 formed with a conical lower end 68 receivable in seat 66 and acting as a needle valve. The top end of rod member 67 carries a disc 69 formed with opposing apertures 70, 70. Engaged in the apertures 70, 70 are the spaced depending fingers 71, 71 carried by a rod 72 which extends rotatably through the top portion of the dashboard panel 12 and is rotatably supported thereon. Secured to the top end of rod 72 is a knob 73 and a pointer 74. Secured on the top panel portion around rod 72 is a calibrated dial 75 marked off in terms of vehicle speed.

Figure 3:
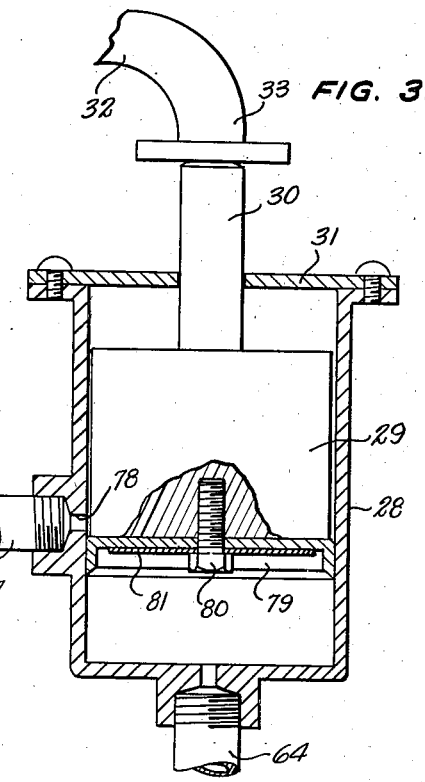
Figure 3 is an enlarged vertical cross-sectional detail view taken through the fluid pressure sensing cylinder employed in the speed governing device of Figure 1.
Figure 4:
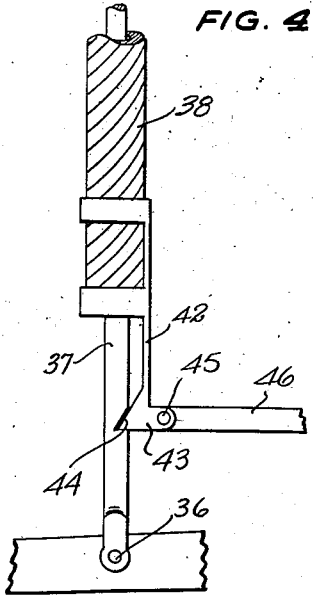
Figure 4 is an enlarged detail elevational view showing a latch member employed to releasably lock the operating shaft of the device of Figure 1 in working position.
Figure 5:
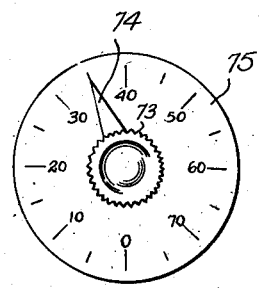
Figure 5 is an enlarged detail view taken on line 5—5 of Figure 1 showing the speed regulating knob and its associated dial as employed in the speed governing device.

Connected to the bottom of valve 61 at passage 65 is a conduit 76 which is connected at its forward end to the upper portion of reservoir 52 and provides a return passage for fluid from the valve. Designated at 77 is a conduit which is connected between conduit 76 and a port 78 formed in the intermediate portion of cylinder 28. Piston 29 is provided with a deformable downwardly flanged sealing cup 79 secured to the lower portion of the piston by a bolt 80 and a disc washer 81, as shown in Figure 3. Under normal conditions when the speed governing device is not in operation, sealing cup 79 is positioned below port 78. When the governing device is in operation, hydraulic fluid is pumped through valve 61 by pump 55 and enters cylinder 28 through conduit 64, raising piston 29 to an elevated position determined by the rate at which the fluid is discharged into the cylinder from conduit 64. The elevation of piston 29 causes rod 30 to act on arm 32 to raise its flanged end 33. At this time, shaft 37 is in a depressed position and is held stationary by the lug 43 which is engaged in notch 44. The pivot bearing 36 is therefore held stationary and provides a fulcrum for arm 32. When flanged end 33 of said arm is raised link bar 35 is moved downwardly causing bell crank arm 21 to be rotated clockwise, as viewed in Figure 1, to a position determined by the degree of elevation of piston 29 in cylinder 28. Throttle lever 16 is therefore rotated by link rod 17 to a desired setting.

The rate at which fluid is discharged into cylinder 28 from conduit 64 depends upon the setting of needle valve rod 67, inasmuch as a certain proportion of fluid pumped into valve 61 returns to the reservoir 52 through the passage 65 and conduit 76. The rate may be manually controlled by setting pointer 74 to a value on dial 75 corresponding to the desired vehicle speed. The rate also depends in some degree on the speed of operation of gear pump 55, but stabilizes at a substantially constant rate soon after the governing device is placed in operation. However, should there be loss of traction, or if for other reasons the propeller shaft of the vehicle tends to increase in speed, the gear pump will increase its speed of operation and will increase the rate of discharge of fluid into cylinder 28 through conduit 64. This elevates piston 29 to a higher position and rotates arm 32 further counter-clockwise than its previously established setting. The counterclockwise movement of arm 32 moves link arm 35 downwardly, causing the bell crank lever 19 to be rotated clockwise, as viewed in Figure 1, and causes rod 17 to rotate throttle lever 16 counter-clockwise, reducing the gas flow through the carbureter 15. This reduces the speed of the vehicle propeller shaft and reduces the speed of operation of pump 55. Under slippery road conditions, the reduction of speed of the propeller shaft aids the vehicle in obtaining better traction.

Under conditions of excessive speed of the engine, as when driving downhill, or the like, where the momentum of the vehicle presents immediate slowing down thereof, piston 29 will rise above the level of port 78, allowing excess fluid to escape from cylinder 28 and return to reservoir 52 through conduits 77 and 76.

As the speed of pump 55 is reduced, the rate of fluid flow through valve 61 is similarly reduced and the rate of discharge of fluid into cylinder 28 from conduit 64 diminishes. Piston 29 therefore drops and arm 32 is rotated clockwise by spring 41, elevating link bar 35 and causing the bell crank lever connected thereto to rotate counterclockwise and move throttle lever 16 clockwise by means of rod 17, to thereby increase the rate of gas flow. The vehicle is thus automatically restored to the speed predetermined by the setting of pointer 74 with respect to dial 75.

To place the automatic speed governing mechanism in operation it is merely necessary to push knob 40 inwardly until the notch 44 on shaft 37 is interlocked with the lug 43 carried by the resilient arm 42. To render the speed governing mechanism inoperative it is merely necessary to depress the clutch lever 51, which disengages lug 43 from notch 44, as previously described.

When the automatic speed governing mechanism is not in operation, the arm 32 is in a substantially floating condition and exerts no force on the link bar 35. The throttle lever 16 is at this time controlled in the conventional manner by the gas pedal 26.

While a specific embodiment of an automatic governor and slip-responsive speed control device for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a motor vehicle internal combustion engine and a clutch lever, a fuel control valve, a throttle lever associated with said valve, a fluid reservoir, a pump connected to said reservoir, means drivingly coupling said pump to the vehicle propeller shaft, a cylinder, conduit means connecting said pump to said cylinder and including manually adjustable fluid by-pass means extending from said conduit means back to said reservoir, a piston in said cylinder, manually settable means for transmitting force from said piston to said throttle lever in accordance with the rate of discharge of fluid into said cylinder from said conduit means, and means connected to the clutch lever of the vehicle for releasing said manually settable means.

2. In combination with a motor vehicle internal combustion engine, a fuel control valve, a throttle lever associated with said valve, a fluid reservoir, a pump connected to said reservoir, means drivingly coupling said pump to the vehicle propeller shaft, a cylinder means connecting said pump to said cylinder and including manually adjustable fluid by-pass means extending back to said reservoir, a piston in said cylinder having a piston rod projecting slidably through the cylinder end wall, a movable support member, an arm pivoted to said support member and engageable with said piston rod, means connecting said arm to said throttle lever, means biasing said support member to a substantially floating position with respect to the piston rod, and means for releasably locking said support member in a position wherein force may be transmitted from said piston rod to said arm.

3. In combination with a motor vehicle internal combustion engine and a clutch lever, a fuel control valve, a throttle lever associated with said valve, a fluid reservoir, a pump connected to said reservoir, means drivingly coupling said pump to the vehicle propeller shaft, a cylinder, means connecting said pump to said cylinder and including manually adjustable fluid by-pass means extending back to said reservoir, a piston in said cylinder having a piston rod projecting slidably through the cylinder end wall, a movable support member, an arm pivoted to said support member and engageable with the end of said piston rod, means connecting said arm to said throttle lever, means biasing said support member to a substantially floating position with respect to the piston rod, resilient detent means engageable with said support member for locking it in a position wherein force may be transmitted from said piston rod through the arm to said throttle lever, and means for releasing said detent means responsive to depression of the vehicle clutch lever.

4. In combination with a motor vehicle internal combustion engine and a clutch lever, a fuel control valve, a throttle lever associated with said valve, a fluid reservoir, a gear pump connected to said reservoir, means drivingly coupling said pump to the vehicle propeller shaft, a cylinder, conduit means connecting said pump to said cylinder and including a by-pass connection extending back to said reservoir, a manually adjustable needle valve controlling the area of said by-pass connection, a piston in said cylinder having a piston rod projecting slidably through the cylinder end wall, a flexible shaft extending adjacent said cylinder a supporting sheath for said shaft secured to the vehicle chassis, an arm pivoted to the end of said shaft and engageable with the end of said piston rod, means connecting said arm to said throttle lever, spring means biasing said flexible shaft to a substantially floating position with respect to the piston rod, resilient detent means engageable with said shaft for locking it in a position wherein force may be transmitted from said piston rod through the arm to said throttle lever, and means coupled to the vehicle clutch lever for moving said detent means to disengaged position with respect to said shaft.

WENSELL I. GOSS.

REFERENCES CITED

The following references are of record in the file of this patent:

UNITED STATES PATENTS

| Number | Name | Date |
|---|---|---|
| 959,087 | Whitcomb | May 24, 1910 |
| 1,068,097 | Benjamin | July 22, 1913 |
| 1,620,764 | Hull | Mar. 15, 1927 |
| 2,021,832 | Callihan | Nov. 19, 1935 |
| 2,302,085 | Wolfe | Nov. 17, 1942 |
| 2,369,397 | Kostenick | Feb. 13, 1945 |

FOREIGN PATENTS

| Number | Country | Date |
|---|---|---|
| 403,476 | Great Britain | Dec. 28, 1933 |